(12) United States Patent
Jeong et al.

(10) Patent No.: US 10,776,727 B2
(45) Date of Patent: Sep. 15, 2020

(54) METHOD OF PROVIDING MEAL PLAN USING REFRIGERATOR AND REFRIGERATOR USING THE SAME

(71) Applicant: LG ELECTRONICS INC., Seoul (KR)

(72) Inventors: Hyocheol Jeong, Seoul (KR); Sanghun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/866,251

(22) Filed: Jan. 9, 2018

(65) Prior Publication Data

US 2018/0129996 A1 May 10, 2018

Related U.S. Application Data

(62) Division of application No. 14/149,351, filed on Jan. 7, 2014, now abandoned.

(30) Foreign Application Priority Data

Jan. 7, 2013 (KR) ........................ 10-2013-0001744

(51) Int. Cl.
*G09B 5/00* (2006.01)
*G06Q 10/06* (2012.01)
*G06Q 10/08* (2012.01)
*F25D 29/00* (2006.01)

(52) U.S. Cl.
CPC ....... *G06Q 10/06311* (2013.01); *F25D 29/00* (2013.01); *G06Q 10/087* (2013.01); *F25D 2400/361* (2013.01)

(58) Field of Classification Search
USPC ........................................................ 434/127
See application file for complete search history.

(56) References Cited

U.S. PATENT DOCUMENTS 8,226,414 B2    7/2012   Bodin et al.

FOREIGN PATENT DOCUMENTS

JP        2002092120 A      3/2002

*Primary Examiner* — Kesha Frisby
(74) *Attorney, Agent, or Firm* — Dentons US LLP

(57) ABSTRACT

Disclosed are a method for providing a meal plan using a refrigerator, and a refrigerator using the same. The method for providing a meal plan using a refrigerator comprises: storing information on food materials stored in a refrigerator; receiving personal information related to a user's health status; updating pre-stored personal information based on the received personal information; generating a reference meal plan based on the stored food material information, such that a plurality of replaceable dishes are included in the reference meal plan; providing a priority of the personal information based on input personal information and a user's selection; generating a meal plan by correcting the reference meal plan, such that dishes cooked with ingredients beneficial to personal information having a high priority are included in the reference meal plan; and providing a meal plan for a special day or a predetermined time period according to a user's selection, wherein at least part of dishes included in the meal plan includes one or more replaceable dishes.

16 Claims, 11 Drawing Sheets

FIG. 7

| | HEALTH MANAGER | | |
|---|---|---|---|
| FAMILY MEAL PLAN | | | |
| ONE-DAY MEAL PLAN | | ONE-WEEK MEAL PLAN | |

◁ DEC. 18, 2011 (SUN) ▷   [TODAY]

| BREAKFAST ≫ | LUNCH ≫ | DINNER ≫ | SNACKS |
|---|---|---|---|
| BOILED RICE WITH KIDNEY BEANS 4BOWLS 200g | BOILED RICE WITH SORGHUM 4BOWLS 200g | BOILED RICE WITH MILLET 4BOWLS 200g | ORANGE 4BOWLS 200g |
| WINTER-GROWN CABBAGE SOUP 4BOWLS 200g | BEAN SPROUTS SOUP 4BOWLS 200g | WINTER-GROWN CABBAGE SOUP 4BOWLS 200g | SOYBEAN MILK 4BOWLS 200g |
| CABBAGE KIMCHI 4BOWLS 200g | SEASONED BEEF IN WIDTH 4BOWLS 200g | CABBAGE KIMCHI 4BOWLS 200g | |
| GRILLED SEASONED -DEODEOK ROOT 4BOWLS 200g | BRAISED PAN-FRIED TOFU 4BOWLS 200g | PORK BULGOGI 4BOWLS 200g | |

▨ MEAL PLAN GUIDANCE   ▨ MEAL PLAN FOR DIABETES PATIENT   ▥ MEAL PLAN FOR HYPERTENSE   ▨ MEAL PLAN FOR OBESITY PATIENT

FIG. 8

BREAKFAST FOR JANUARY 28

YOU CAN CHANGE MEAL PLAN BY SELECTING ALTERNATIVE FOOD

| BOILED RICE | ☑ BOILED RICE WITH KIDNEY BEANS | ☐ BOILED RICE WITH CEREALS | ☐ BOILED RICE WITH CHESTNUTS |
|---|---|---|---|
| SOUP | ☑ WINTER-GROWN CABBAGE SOUP | ☐ SOYBEAN PASTE SOUP WITH SPINACH | ☐ SOYBEAN PASTE SOUP WITH YOUNG RADISH |
| MAIN DISH | ☑ CABBAGE KIMCHI | ☐ STIR-FRIED RAZOR-CLAM MEAT WITH VEGETABLES | ☐ STEAMED EGGS |
| SIDE DISH | ☑ GRILLED SEASONED -DEODEOK ROOT | ☐ LEEK SALAD DRESSED WITH GARLIC AND CHILI POWDER ETC | ☐ WATER PARSLEY SALAD |

[ STORAGE ]   [ CANCEL ]

METHOD OF PROVIDING MEAL PLAN USING REFRIGERATOR AND REFRIGERATOR USING THE SAME

CROSS-REFERENCE TO RELATED APPLICATION

This application is a Divisional application of U.S. patent application Ser. No. 14/149,351, filed on Jan. 7, 2014, which claims the benefit of Korean Patent Application No. 10-2013-0001744, filed on Jan. 7, 2013, all of which are hereby incorporated by reference in their entirety for all purposes as if fully set forth herein.

BACKGROUND OF THE DISCLOSURE

1. Field of the Disclosure

The present disclosure relates to a method for providing a meal plan using a refrigerator and a refrigerator using the same.

2. Background of the Disclosure

A refrigerator is a type of storage device for storing food items for a long time. The refrigerator is configured to maintain an inner space at a preset temperature using a cooling means such as a refrigerating cycle, thereby storing food items with a fresh state for a longer time.

As information communication technology develops, the refrigerator having a storage function as a main function is provided with various functions. For this, there have been provided methods for enhancing a user's convenience by providing a refrigerator with information on food items stored therein.

A representative method among such methods is a recipe providing method. More specifically, Korean Patent Application No. 10-2006-0112400 provides a method for displaying dish items using a refrigerator. According to the method, a plurality of recipes are pre-stored in a refrigerator, and the stored recipes are provided on a display unit at random so that a user can select one of the provided recipes. The method is advantageous in that a desired recipe can be easily obtained without an additional search. However, the method is disadvantageous in that utilization is low because pre-stored recipes are provided at random.

Korean Patent Application No. 10-2006-0112400 provides a food management system of a refrigerator, and a method for managing the same. The method relates to a technique for storing types of food items stored in a refrigerator and generating a meal plan based on the food items. According to the technique, a meal plan utilizing food materials stored in the refrigerator can be provided. This can prevent waste of the food materials, or unnecessary purchase of new food materials.

SUMMARY OF THE DISCLOSURE

Therefore, an aspect of the detailed description is to provide a method for providing a meal plan capable of enhancing productivity of a refrigerator by providing an optimized meal plan suitable for a personal health state, and a refrigerator using the same.

To achieve these and other advantages and in accordance with the purpose of this specification, as embodied and broadly described herein, there is provided a method for providing a meal plan using a refrigerator, the method comprising: storing information on food materials stored in a refrigerator; receiving personal information related to a user's health status; updating pre-stored personal information based on the received personal information; generating a reference meal plan based on the stored food material information, such that a plurality of replaceable dishes are included; providing a priority of the personal information based on input personal information and a user's selection; generating a meal plan by correcting the reference meal plan, such that dishes cooked with ingredients beneficial to personal information having a priority are included in the reference meal plan; and providing a meal plan for a special day or a predetermined time period according to a user's selection, wherein at least part of dishes included in the meal plan includes one or more replaceable dishes, wherein the personal information is input from a user through a manipulation means of the refrigerator, or is input from an external storage device or an external measuring device through a communication means, and wherein the step of updating includes determining whether to update pre-stored personal information or not, by considering the personal information as recent information if the personal information has been input from a user, and by comparing an updated date of the pre-stored personal information with an acquired date of the personal information if the personal information has been input from the external storage device or the external measuring device.

In an aspect of the present invention, a meal plan may be determined by utilizing information on the food materials stored in the refrigerator. In this case, personal information on a health status such as a birth date, a height, a weight and a blood pressure may be together considered. For instance, when a user's height is short for his or her age, a meal plan where ingredients advantageous to height growth have been firstly utilized may be provided. When a user's weight is overweight, a meal plan where a small amount of fats or ingredients of low calories have been firstly utilized may be provided.

In an aspect of the present invention, a reference meal plan may be generated by utilizing ingredient information. Then, a meal plan is generated by excluding dishes cooked with ingredients which should not be taken, from the reference meal plan, based on input personal information, and by replacing the excluded dishes by other dishes cooked with more healthy ingredients. Alternatively, a plan may be determined by excluding ingredients which should not be taken from the reference meal plan, and then by using the rest ingredients.

For a user's enhanced convenience, at least part of dishes included in each meal may include a plurality of alternative dishes.

That is, in a case where a single meal is composed of a rice, a soup and several side dishes, the soup may include a plurality of soups such that a user selects a desired soup.

The personal information may be directly input by a user. The personal information should be continuously updated and should have precision, for an enhanced effect of such meal plan. However, the personal information may not be smoothly updated due to inconvenient inputs. Accordingly, such personal information may be measured from an external institution such as a hospital, a pharmacy or other examination institution, or measured using an external measuring device having a communication means. Then, the measured personal information may be transmitted to the refrigerator.

Under such configuration, the personal information can have enhanced precision, and can be updated.

The personal information may include at least one of a birth date, a height, a weight, a blood pressure, a type of allergic food, a medical history and a prescription.

Alternatively, the personal information may include all of a birth date, a height, a weight, a blood pressure, a type of allergic food, a medical history and a prescription. In a case where there is no additional designation, information on a type of allergic food, a medical history and a prescription may be set to have a priority.

Such priority may be predetermined by a preset reference based on input personal information, or may be selected by a user. Some items may be set as designated items based on a user's selection or input personal information, and the designated items may have a higher priority than non-designated items.

The step of inputting personal information may include receiving information on a plurality of members, and the step of generating a meal plan may include generating a common meal plan based on personal meal plans determined with respect to the plurality of members. The common meal plan may include at least one of common dishes included in the personal meal plans. That is, meal plans for the respective individuals may be provided, or a common meal plan for all family members may be provided. The common meal plan may include only common dishes of all family members among dishes included in the respective personal meal plans. Alternatively, the common meal plan may include some of common dishes of all family members. In this case, the common meal plan may be configured to exclude ingredients which should not be taken.

The step of providing a meal plan may include providing specific personal meal plans or a common meal plan according to a user's selection.

In the step of providing a meal plan, information on calories of included dishes may be provided. The calorie information may be provided per dish which constitutes a meal plan, per meal, or per day.

In the step of providing a meal plan, dishes selected with consideration of personal information having a high priority may be displayed in a differentiated manner from other dishes. That is, in a case where a user has diabetes, dishes advantageous to diabetes may be displayed so as to be distinguished from other dished in a visual manner.

In the step of providing a meal plan, the number of meals or the number of dishes included in each meal may be arbitrarily set by a user. Regular meals and snacks may be provided in a distinguished manner from each other.

In a case where food materials required for a generated meal plan are insufficient, the method may further comprise displaying a type and the amount of the food materials. In a case where the number of types or the amount of food materials stored in the refrigerator is insufficient, information on the food materials may be provided together with meal plan information. This can allow a user to check insufficient food materials.

The method may further comprise transmitting, to an external device, information on a type and the amount of insufficient food materials. If the external device is an Internet mall server, the transmitted information may be used when purchasing the corresponding food materials on an Internet mall.

The external storage device may be included in a personal information server provided at a medical institution or an examination institution. That is, a medical institution or an examination institution is provided with a personal information server where medical information on a patient is stored. A storage device provided at the personal information server may be utilized as the external storage device of the present invention.

The step of receiving personal information may include: requesting personal information from the personal information server; providing the personal information server with authentication information on an information request right; and receiving the personal information from the personal information server.

The external measuring device may include a diagnosis device having a communication means. For instance, the external measuring device may be implemented as a body weight scale, an extensometer, a blood pressure monitor, or etc. The external measuring device may transmit measured information to another device using the communication means. The transmitted information may be utilized to update personal information stored in the refrigerator.

The communication means may include an NFC means. The step of receiving personal information may include: measuring a user's personal information using an external measuring device; transmitting the measured personal information to a mobile terminal through the NFC means; and transmitting the measured personal information to the refrigerator from the mobile terminal.

The method may further comprise calculating a body mass index (BMI) based on input personal information. The BMI may be selectively displayed according to a user's selection.

The method may further comprise: storing a generated meal plan for a predetermined time period; and transmitting the stored meal plan to a server provided at a medical institution. The transmitted information may be utilized as reference data for diagnosis at the medical institution.

To achieve these and other advantages and in accordance with the purpose of this specification, as embodied and broadly described herein, there is also provided a refrigerator having a meal plan generating means, the refrigerator comprising: an input means configured to input personal information related to a user's health status; a personal information storage means configured to store the input personal information; a food material information storage means configured to store information on types and the amount of food materials stored in the refrigerator; a recipe storage means configured to store information on ingredients and recipes required for a plurality of dishes; a food information storage means configured to store information on effects of each ingredient or each dish on health; a controller configured to generate a meal plan based on the food material information and the recipes, and configured to generate a meal plan by replacing or deleting dishes included in the generated meal plan, using the personal information storage means and the food material information storage means; and a display means configured to display the generated meal plan.

The personal information may include at least one of a birth date, a height, a weight, a blood pressure, a type of allergic food, a medical history and a prescription. The personal information may be directly input by a user through the input means. Alternatively, the personal information may be transmitted from an external personal information server or an external measuring means, and then may be stored in the personal information storage means.

The external personal information server may store personal information measured or generated from a medical institution or an examination institution.

The personal information storage means may store personal information transmitted from the external personal information server or the measuring device, via a mobile terminal.

The controller may calculate calories of dishes included in the generated meal plan, and may display the calculated calories together with the meal plan through the display means.

In another aspect of the present invention, there is provided a method for providing a meal plan using a refrigerator, the method comprising: receiving information on food materials stored in a refrigerator; receiving and storing personal information related to a user's health status, the personal information input from a user, or transmitted from a personal information server provided at a medical institution or an examination institution; sorting the stored food materials into food materials which should not be taken, and food materials which are recommended, based on the stored personal information; generating a meal plan including a plurality of alternative dishes, using the rest food materials except for the food materials which should not be taken; correcting the generated meal plan, such that at least one dish using the food materials which are recommended is included; and providing the corrected meal plan.

In still another aspect of the present invention, there is provided a method for providing a meal plan using a refrigerator, the method comprising: receiving information on food materials stored in a refrigerator; receiving and storing personal information related to a user's health status, the personal information input from a user, or transmitted from an external measuring device, and storing the personal information; sorting the stored food materials into food materials which should not be taken, and food materials which are recommended, based on the stored personal information; generating a meal plan including a plurality of alternative dishes, using the rest food materials except for the food materials which should not be taken; correcting the generated meal plan, such that at least one dish using the food materials which are recommended is included; and providing the corrected meal plan.

The external measuring device may transmit measured information using an NFC. The external measuring device may transmit measured information to the refrigerator, via a mobile terminal, using an NFC.

The present invention may have the following advantages.

Firstly, a meal plan considering a personal health status as well as a type of stored food materials can be provided from the refrigerator. This can allow the refrigerator to have more various functions.

Secondly, personal information used to determine a meal plan can be input from a user, or can be transmitted from a medical institution or an examination institution. Alternatively, information measured from an external measuring device can be used as the personal information. This can enhance precision of information, allow continuous update of information, and enhance effectiveness of a provided meal plan.

Thirdly, information on a meal plan provided to a user can be shared with a medical institution, etc. This can allow the medical institution to diagnose a patient more precisely.

Fourthly, a user can select the number of meals included in a meal plan, or types of dishes, and can be provided with a plurality of alternative dishes. Accordingly, a meal plan reflecting a user's personal taste can be provided.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 7 is a front view illustrating a screen for providing a family meal plan for one day in the refrigerator;

FIG. 8 is a front view illustrating a screen for providing an alternative meal plan to the meal plan provided in the refrigerator;

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
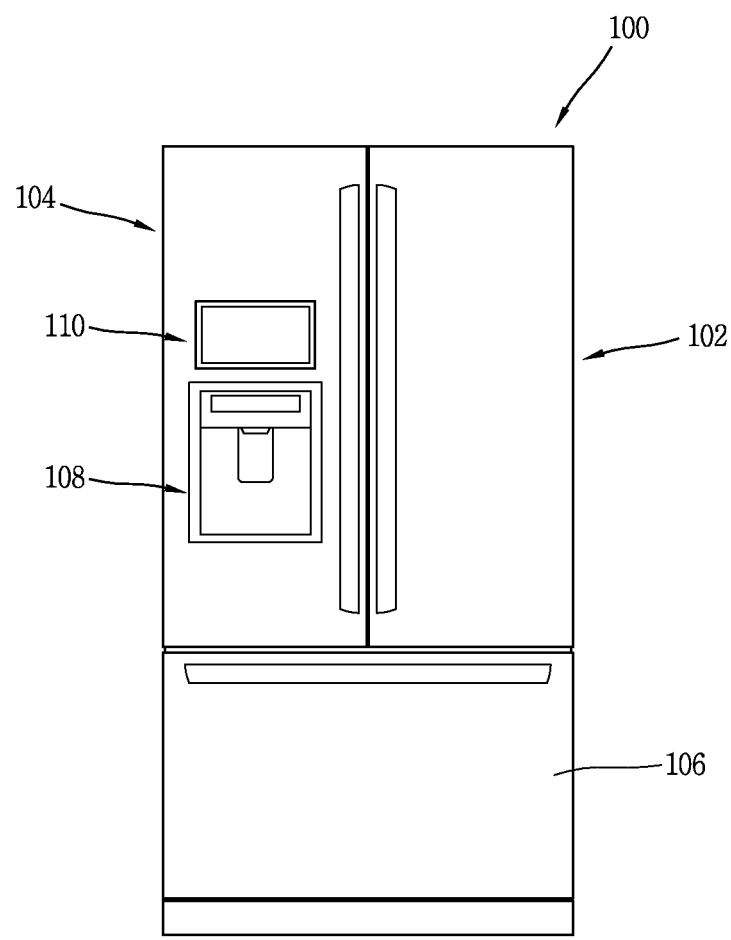
FIG. 1 is a front view illustrating a refrigerator having a meal plan generating means according to an embodiment of the present invention.

FIG. 1 is a front view illustrating a refrigerator 100 having a meal plan generating means according to an embodiment of the present invention.

Referring to FIG. 1, the refrigerator 100 includes a refrigerating chamber provided at an upper side thereof, and a freezing chamber provided at a lower side thereof. A first refrigerating chamber door 102 and a second refrigerating chamber door 104 are provided to open and close the refrigerating chamber, and a freezing chamber door 106 is provided to open and close the freezing chamber. The first refrigerating chamber door 102 and the second refrigerating chamber door 104 are installed so as to be open and closed as a single refrigerating chamber is divided into two. Under such configuration, a user can partially open the refrigerating chamber when storing one or more items in the refrigerating chamber or when withdrawing the stored items. This is advantageous in that leakage of cool air can be prevented. However, the present invention is not limited to the refrigerator. That is, the present invention may be also applied to a "two-door type of refrigerator" where a freezing chamber and a refrigerating chamber are disposed in parallel.

One end of the first refrigerating chamber door 102 and the second refrigerating chamber door 104 is mounted by a hinge (not shown) so as to be rotatable with respect to a cabinet 102. The freezing chamber door 106 may be configured to be open and closed in a rotating manner like the refrigerating chamber door. However, in this embodiment, the freezing chamber door 106 is configured as a drawer type door. That is, the freezing chamber door 106 is formed to have a basket shape which can be withdrawn to a user.

A dispenser 108, configured to provide water or ice, is installed on a front surface of the second refrigerating chamber door 104. A detailed configuration of the dispenser 108 will be omitted. A display 110 including a touch panel is installed above the dispenser 108. The display 110 is configured to display a state relating to an operation of the refrigerator. Further, the display 110 serves as a manipulating means which allows a user to perform his or her desired function through the touch panel mounted therein.

Figure 2:
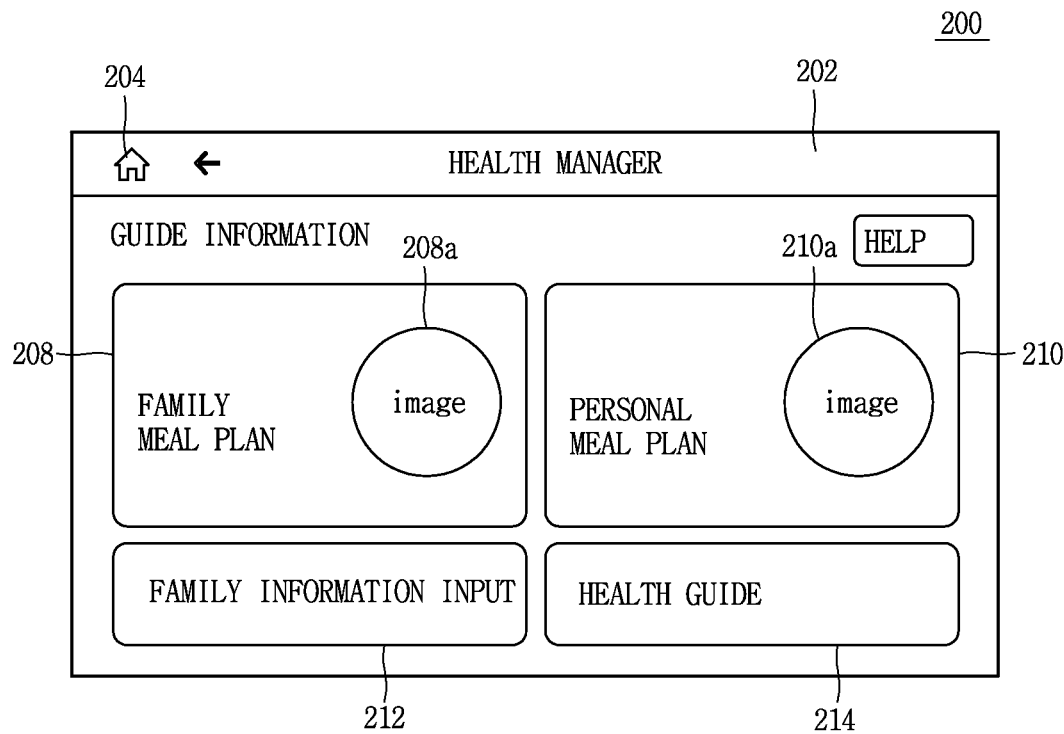
FIG. 2 is a front view illustrating an initial screen for providing a meal plan, the initial screen provided on a display panel in the refrigerator.

FIG. 2 is a front view illustrating an initial screen 200 for providing a meal plan. A user can enter menus by touching a meal plan icon (not shown) displayed on the display 110. A title bar 202 is positioned at an uppermost region of the initial screen 200, and a home button 204 for returning to a home screen is formed on the left side of the title bar 202. Upon touch of the home button 204, the refrigerator can enter a home screen for selecting other functions.

A help button 206 for calling help is positioned at a lower end of the title bar 202, and a family meal plan button 208 and a personal meal plan button 210 are positioned below the help button 206. The family meal plan button 208 is used to provide a meal plan suitable to all registered family members, and the personal meal plan button 210 is used to provide a meal plan for each person.

The family meal plan and the personal meal plan will be explained later.

An image region 208a, where an image indicating a function of the family meal plan button 208 is arranged, is positioned in the family meal plan button 208. An image region 210a, where an image indicating a function of the personal meal plan button 210 is arranged, is positioned in the personal meal plan button 210. A family information input button 212 is positioned below the family meal plan button 208, and a health guide button 214 for providing health-related information is positioned below the personal meal plan button 210. A function of each button will be explained later.

As shown in FIG. 2, a plurality of buttons are arranged on the initial screen 200. As the family meal plan button 208 and the personal meal plan button 210 are exposed to the initial screen, a user can enter menus in an intuitive and rapid manner. The two buttons are formed to have a largest area, so that frequently-used functions can be easily selected.

Figure 3:
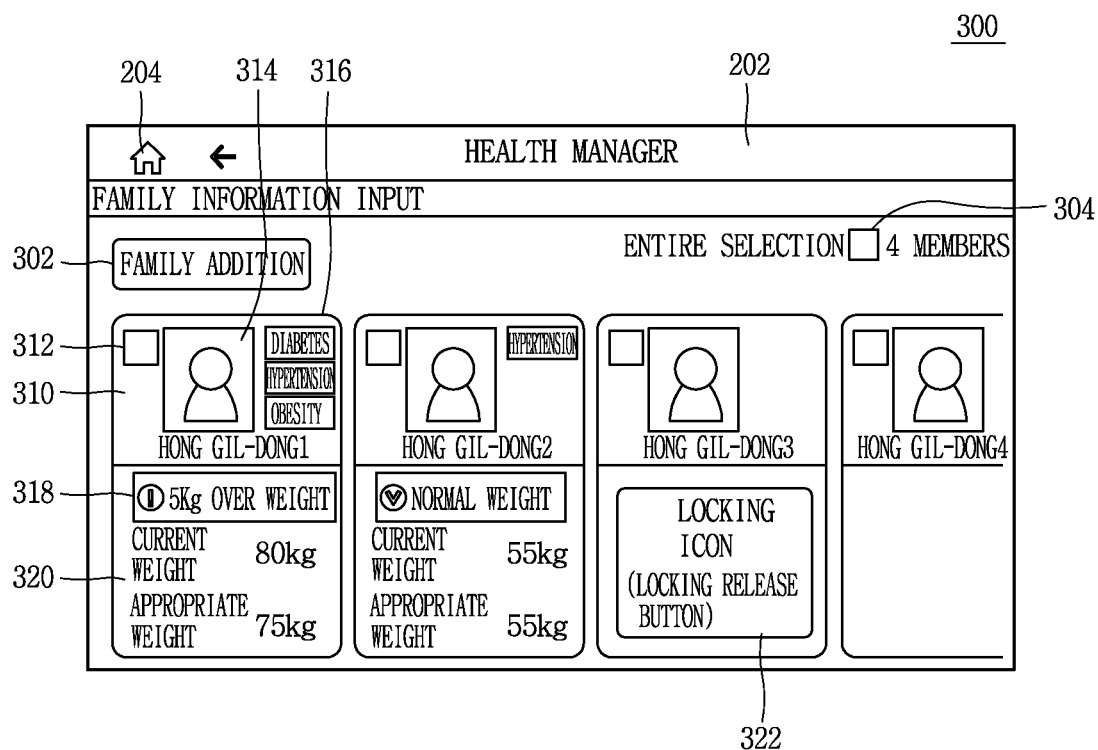
FIG. 3 is a front view illustrating a screen indicating personal information in the refrigerator.

FIG. 3 is a front view illustrating a family information screen 300 shown when the family information input button 212 is touched. A family addition button 302, configured to move to a screen for adding family members, is disposed on the left side below the title bar 202. An entire selection check box 304, configured to select all family members at one time, is disposed on the right side below the title bar 202. The entire selection check box 304 may be utilized when all family members are deleted or information on all the family members is edited. If the entire selection check box 304 is used, the screen needs not be scrolled even when there are a large number of family members. This can allow a user to select a desired member in a convenient manner.

An information display region 310, configured to display information on each family member in a summarized manner, is disposed below the family addition button 302. Each information display region 310 is implemented as a rectangular region having a different shadow. A check box 312 is disposed at an uppermost left side, and a profile image 314 is disposed on the right side of the check box 312. Upon touch of the check box 312, a menu for editing or deleting corresponding personal information is popped up so that a user can edit or delete information. When there is an image selected by a user, the image is firstly displayed on the profile image 314. On the other hand, if there is no image selected by a user, a predetermined image is displayed on the profile image 314.

A disease information region 316 is disposed on the right side of the profile image 314. A type of a current disease of a user is displayed on the disease information region 316, as an icon of a different color, based on personal information input by a user or received from outside. In a case where there are a plurality of diseases, a disease having a high risk is disposed at an upper end of the disease information region 316, so that a user can firstly recognize the disease.

A warning window 318, which informs the degree of obesity, is disposed below the profile image 314. The warning window 318 informs the degree of obesity based on a user's input height and weight. The warning window 318 displays a case of a normal weight and a case of an abnormal weight in different colors, so that a user can recognize the cases more easily.

A weight display region 320, configured to display a substantial weight input by a user and an ideal weight, is disposed below the warning window 318. In some cases, a user may wish his or her body information not to be exposed to other family members. Accordingly, corresponding information may be displayed only when a preset password is input. In such a case where locking has been performed, a locking icon 322 is displayed instead of the warning window and the weight display region. Upon touch of the locking icon 322, a password input window is popped up. The warning window 318 and the weight display region 320 are configured to display information only when a password is input to the password input window.

Figure 4:
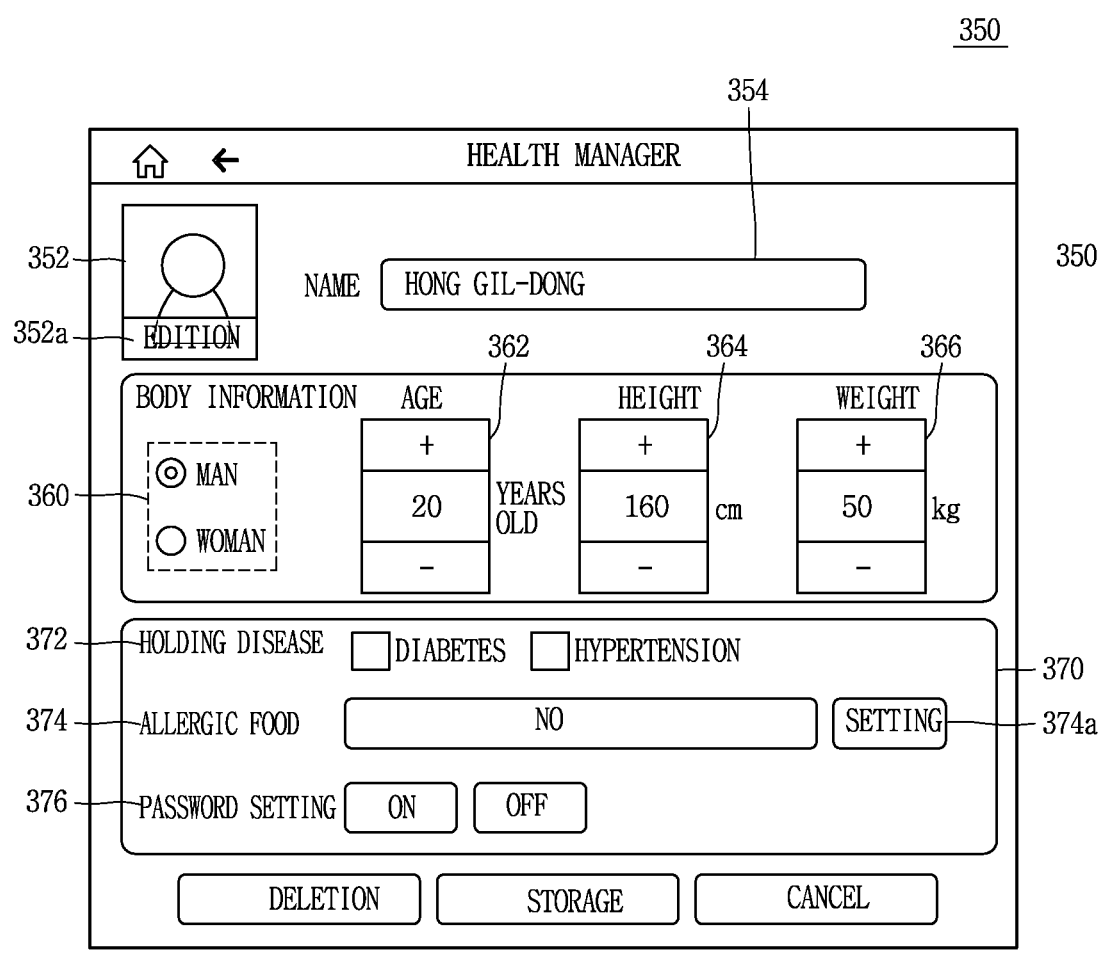
FIG. 4 is a front view illustrating a screen for adding or editing personal information in the refrigerator.
Figure 5:
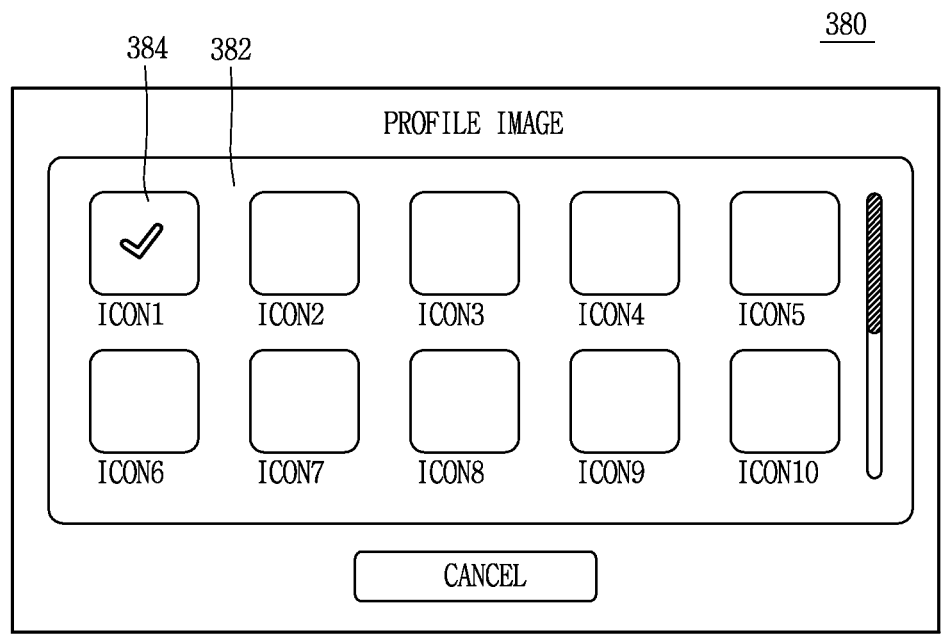
FIG. 5 is a front view illustrating a screen for selecting a person's profile image in the refrigerator.

Upon selection of the family addition button 302, the current screen is moved to the personal information input screen 350 of FIG. 4. A profile image 352 is positioned on the left side below a title bar of the personal information input screen 350, and an edition button region 352a is positioned below the profile image 352. Upon touch of the edition button region 352a, a profile image selection window 380 of FIG. 5 is popped up. As a plurality of sample images 384 are selected, a profile image may be changed. A scroll bar 382, configured to scroll a non-displayed additional sample image on the screen, is positioned on the right side of the screen. A user may upload any image as well as an already-provided image, for utilization as a profile image.

Referring to FIG. 4 back, a name input window 354 is positioned on the right side of the profile image 352. Upon touch of the name input window 354, a virtual keyboard is popped up on a screen for input of a text. A body information box is positioned below the profile image. The body information box includes a sex box 360, an age box 362, a height box 364 and a weight box 366. Personal information input to the body information box may be utilized as reference information when determining a meal plan. A designated item box 370 is positioned below the body information box. The designated item box 370 includes a box for inputting a user's disease, and a box for inputting allergic food.

Figure 6:
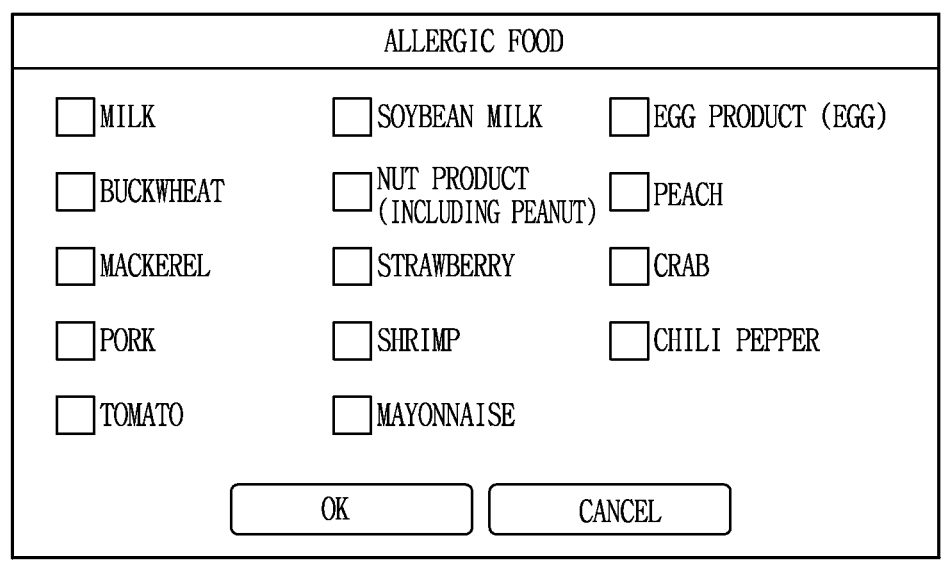
FIG. 6 is a front view illustrating a screen for inputting a person's allergic food in the refrigerator.

More specifically, a holding disease selection box 372 is positioned at an upper region of the designated item box 370. In FIG. 4, whether a user has diabetes and hypertension can be input to a check box. A type of a disease and the number of diseases may be arbitrarily set. An allergic food box 374 is positioned at an intermediate region of the designated item box 370. More specifically, upon touch of the allergic food box 374, an input window 390 of FIG. 6 is popped up so that a user can select allergic food. The input window 390 may include a plurality of allergic food, and one or more may be selected from the plurality of allergic food. Once one or more allergic food are selected and then a setting button 374a of FIG. 4 is pressed, information on the selected allergic food may be stored.

A password setting box 376, which is positioned at a lowermost region of the designated item box 370, is used when a user does not wish to expose his or her body information to outside. When a user selects one of an 'ON' button and an 'OFF' button, a corresponding function may be activated or deactivated. If a user touches the 'ON' button to activate a corresponding function, a password input window is popped up so that the user can input a password.

FIG. 7 is a front view illustrating a family meal plan providing screen 400 for one day, in a case where the family meal plan button 208 is touched on the initial screen. Referring to FIG. 7, a one-day meal plan tap 402 and a one-week meal plan tap 404 are positioned below the title bar. Upon touch of the one-day meal plan tap 402, a one-day meal plan of FIG. 7 is provided. A date display unit 410, configured to display a current date, is positioned below the one-day meal plan tap 402. Any date may be selected as two arrows arranged on the date display unit 410 are touched. A button 412 for displaying today's meal plan is disposed on the right side of the data display unit 410. A dish display unit 420, positioned at an approximate central region of the family meal plan providing screen 400, provides various types of dishes of a meal plan in the form of a chart. Similar types of dishes are arranged on the same line, and dishes included in each meal are arranged on the same column. A name and an amount of a corresponding dish are displayed on each region. A dish selected with respect to the designated item is displayed in a different color from other dishes. For instance, grilled seasoned-deodeok root for breakfast, which is provided for a diabetes patient, is displayed in a different color from other dishes. Explanatory notes 430, configured to provide explanations on diseases relating to the respective colors, are positioned below the dish display unit 420.

A provided dish may be replaced by other dish. For this, dishes included in each meal include a plurality of alternative dishes. Upon touch of a title region 422 positioned above the dishes, an alternative dish selection screen 450 of FIG. 8 is shown. FIG. 8 illustrates a case where a breakfast plan has been selected. A user can freely select desired menus from various types of menus for breakfast. Dishes included in side dishes have been selected for a diabetes patient.

In FIG. 8, the entire dishes included in one meal are displayed. However, in a case where a region corresponding to a specific dish is selected from the screen of FIG. 7, a screen which can replace only the corresponding dish is popped up.

In a case where a region corresponding to a specific dish is selected, a pop-up window may be displayed so as to provide a recipe and required materials with respect to the corresponding dish. For instance, a list of required food materials may be displayed together with the pop-up window with respect to the recipe. In this case, food items stored in the refrigerator may be displayed in a distinguished manner from food items not stored in the refrigerator. Information on food items not stored in the refrigerator may be transmitted to outside through a communication means provided at the refrigerator. The transmitted information may be interworked with an Internet shopping mall, etc., thereby allowing a user to purchase the corresponding food materials in a more convenient manner.

Figure 9:
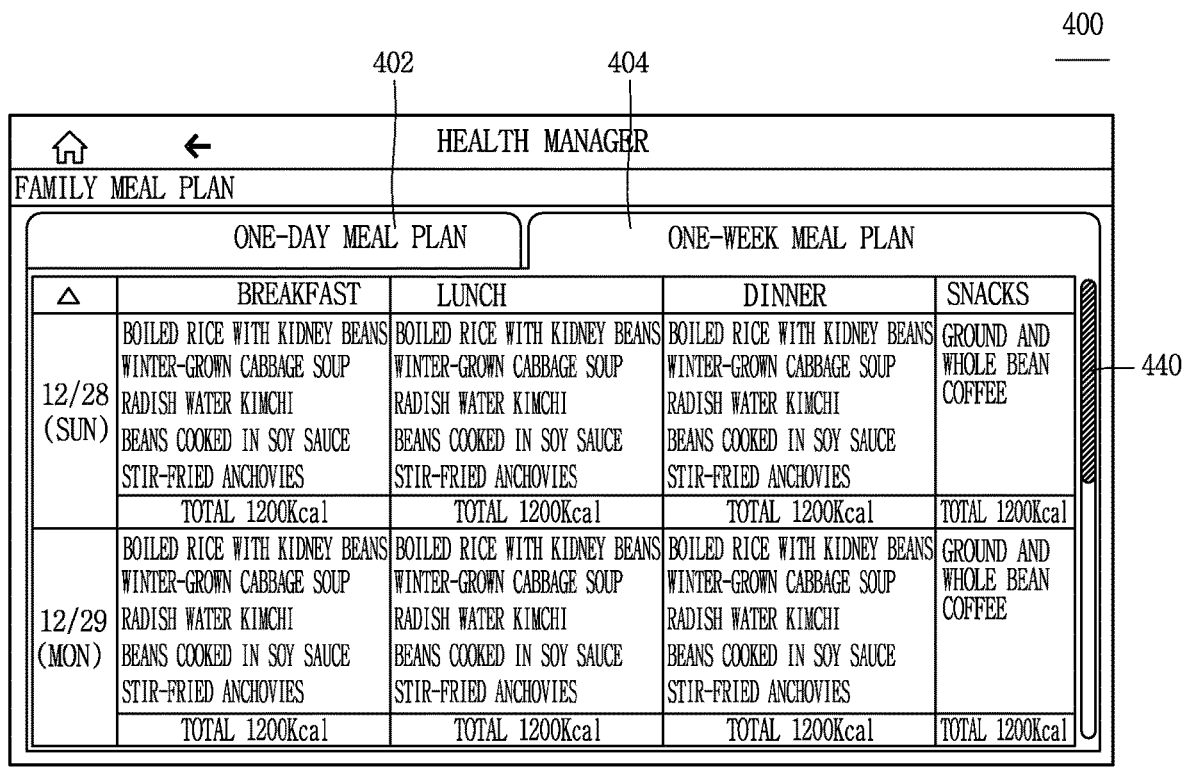
FIG. 9 is a front view illustrating a screen for providing a family meal plan for one week in the refrigerator.

FIG. 9 illustrates a one-week meal plan displayed when the one-week meal plan tap 404 is selected. Dates are displayed on the left column of the screen, and dishes for each meal are displayed per corresponding date. Upon touch of an uppermost region on a date display column where a triangle has been displayed, a meal plan for the previous week is displayed. On the other hand, upon touch of a lowermost region (not shown) on the date display column, a meal plan for the next week is displayed. Like in the one-day meal plan, each menu or the entire menus may be replaced like in the one-week meal plan. Each meal is displayed with information on the total calories. The information on the total calories may be displayed on the one-day meal plan.

FIGS. 8 and 9 display a one-day meal plan and a one-week meal plan. However, such period may be arbitrarily changed. Two more taps may be provided. One of breakfast, lunch and dinner may be excluded or other item may be added. Snacks may be excluded from each meal plan.

Figure 10:
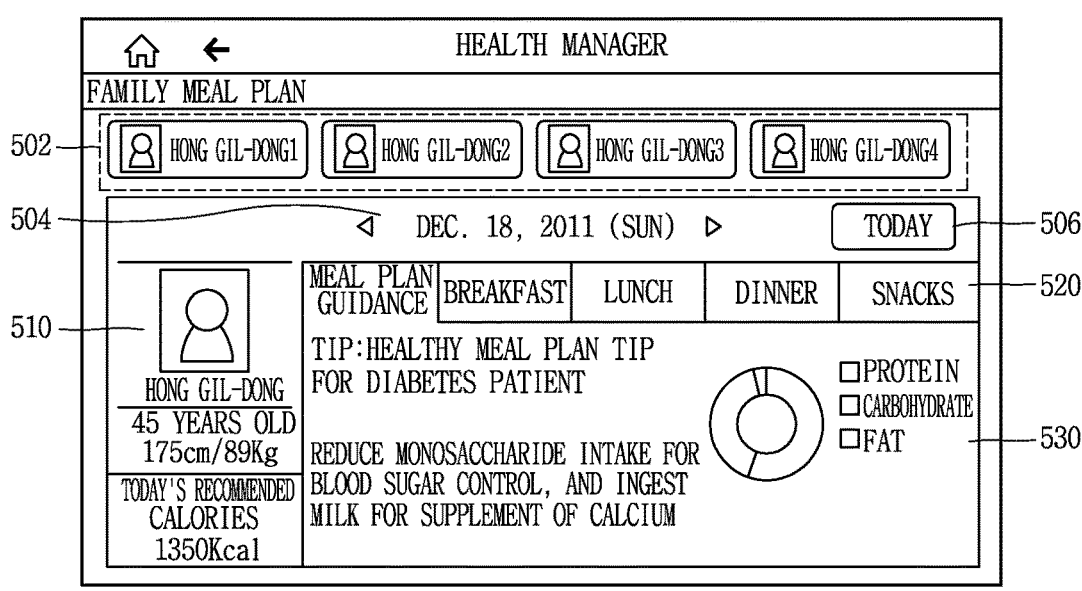
FIG. 10 is a front view illustrating an initial screen for providing a personal meal plan in the refrigerator.
Figure 11:
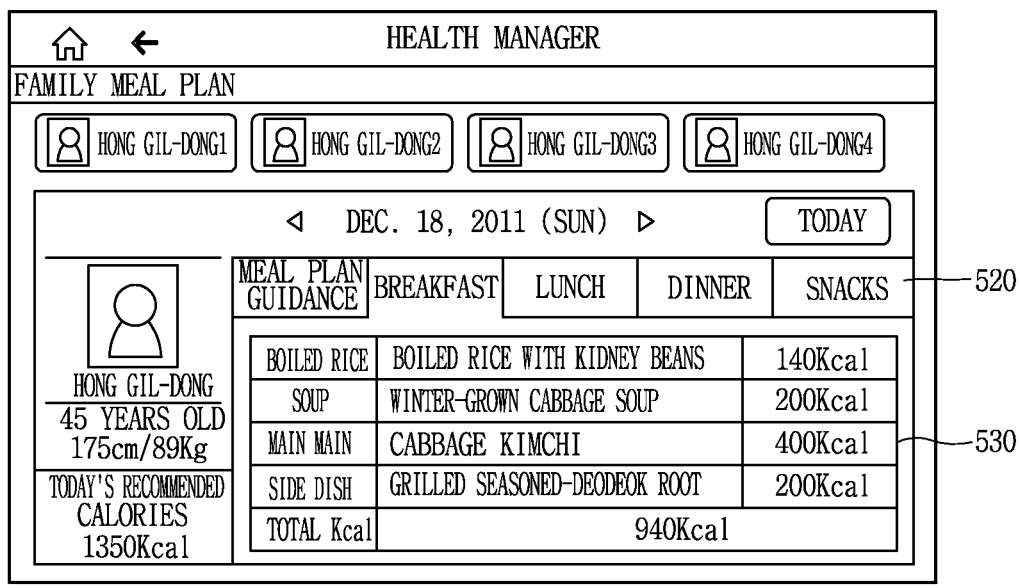
FIG. 11 is a front view illustrating a screen for providing a personal meal plan in the refrigerator.

FIG. 10 illustrates a personal meal plan screen 500 shown when the personal meal plan button 210 has been selected. Member selection buttons 502 for selecting input members are arranged below a title bar. Upon selection of one of the member selection buttons 502, a meal plan for the corresponding member is provided.

Like in the family meal plan, a date display unit 504 and a button 506 for displaying a meal plan of the day are arranged below the member selection buttons 502.

As shown, a personal profile display region 510 is positioned on the left side of the personal meal plan. A profile image, a name, a height, a weight and information on recommended calories are displayed on the personal profile display region 510.

A plurality of taps 520 are arranged on the right side of the personal profile display region 510. The taps include a meal plan guidance tap, a breakfast tap, a lunch tap, a dinner tap and a snack tap. An information display region 530 is provided below the taps 520. The information display region 530 displays corresponding information according to a selected tap. For instance, upon selection of the meal plan guidance tap, information on health is provided and nutritious information on a meal plan provided on the corresponding date is provided in the form of a graph.

As another example, upon selection of the breakfast tap, a breakfast meal plan of a corresponding date is provided. The breakfast meal plan provides various types of dishes, calories per dish and the total calories. As aforementioned, the dishes may be replaced by other dishes by a user.

Figure 12:
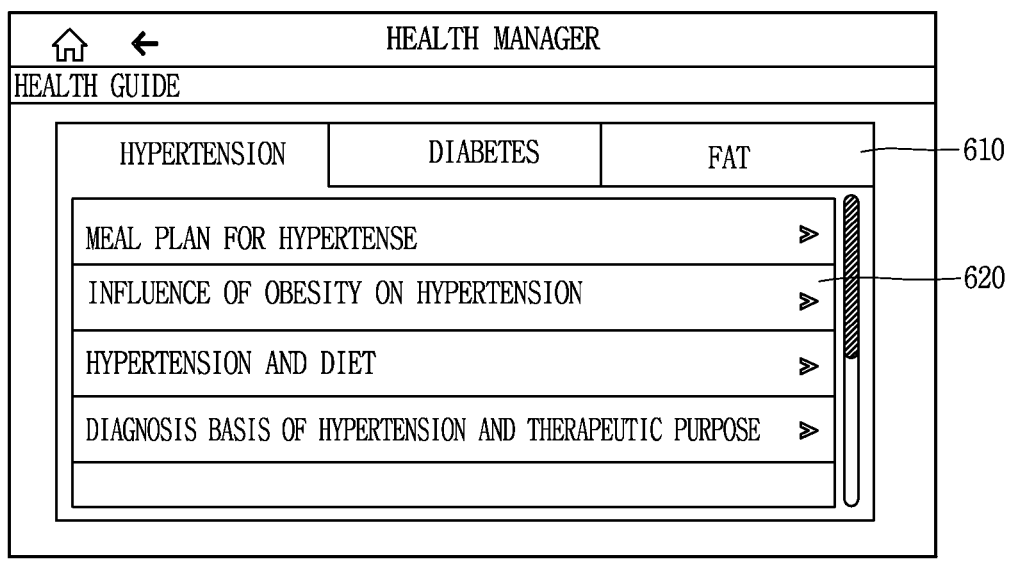
FIG. 12 is a front view illustrating a screen for providing health-related information in the refrigerator.

FIG. 12 illustrates a health information providing screen 600 displayed when the health guide button 214 on the initial screen of FIG. 2 has been selected. A tap 610 for selecting a desired type of disease for detailed information is provided at an upper side of the health information providing screen 600. An information display region 620 for providing health information on a selected disease is provided below the tap 610. The health information may be input in advance, or may be received from outside through a communication means.

Figure 13:
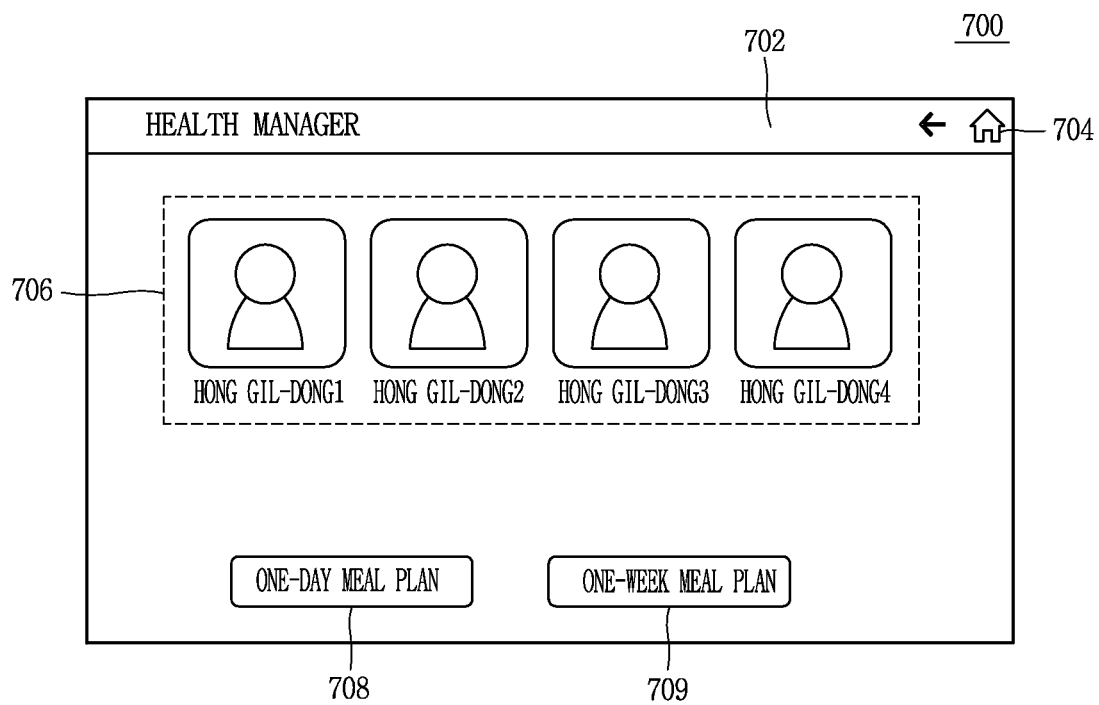
FIG. 13 is a front view illustrating a modification example of the initial screen of FIG. 2.

A personal meal plan rather than a family meal plan may be provided. FIG. 13 illustrates a modified initial screen 700 in a case where only a family meal plan is provided. The modified initial screen 700 is the same as the initial screen of FIG. 2 in that it is provided with a title bar 702 and a home button 704. On the modified initial screen 700, a member information display region 706 for displaying profile images and names of stored members is provided below the title bar 702. A one-day meal plan button 708 and a one-week meal plan button 709 are disposed below the member information display region 706. On the modified initial screen 700, a user can directly enter an icon for meal plan information. Alternatively, a user can directly enter a screen for checking or correcting personal information. This can enhance a user's convenience.

Figure 14:
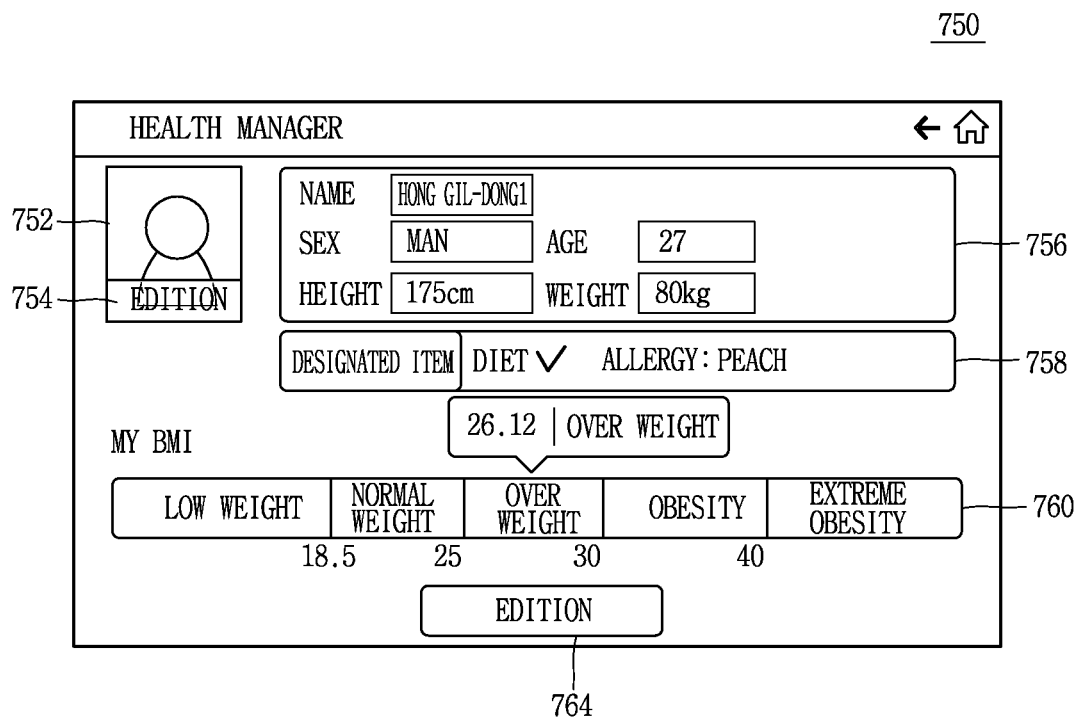
FIG. 14 is a front view illustrating a modification example of the screen indicating personal information of FIG. 3.

FIG. 14 illustrates a personal information screen 750 displayed when one of the members is selected. A profile image 752, a personal information display region 756, and a designated item display region 758 are displayed on the personal information screen 750. An edition button region 754 is provided at a lower end of the profile image 752, so that the profile image 752 can be replaced by other profile image. A name, a sex, an age, a height and a weight of a selected member are displayed on the personal information display region 756. A user's medical history and a user's additional designated item (whether to perform a diet or not in FIG. 14) are displayed on the designated item display region 758. The additional designated item may be arbitrarily selected by a user, and various items may be set as the added designated item.

A body mass index (BMI) display region 762 is disposed below the designated item display region 758. A value on the BMI display region 762 is calculated based on an input height and weight. According to the calculated value, a user's weight status is classified into 5 grades, i.e., a low weight, a normal weight, an over weight, obesity and extreme obesity. In this embodiment, a user's weight status corresponds to an over weight. A BMI bar 760 is displayed below the BMI display region 762 so that a user can easily check his or her weight status.

Figure 15:
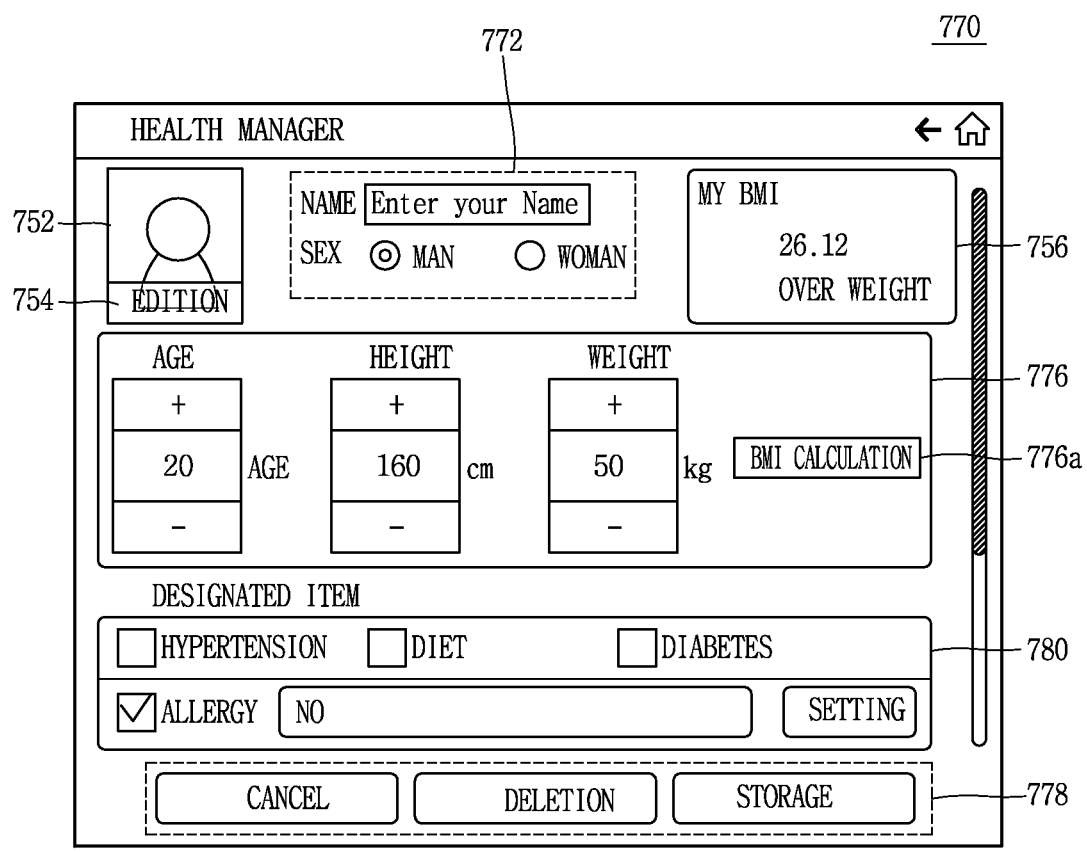
FIG. 15 is a front view illustrating a modification example of the screen for adding or editing personal information of FIG. 4.

An edition button 764 for correcting input personal information is disposed at a lower end of the personal information screen 750. FIG. 15 illustrates a personal information input screen 770 displayed when the edition button 764 has been touched. The personal information input screen 770 is also displayed when a personal information addition button has been selected from the initial screen.

A name/sex box 772 and a BMI display region 774 are disposed at an upper end of the personal information input screen 770. An input region 776 for inputting an age, a height and a weight is disposed below the name/sex box 772 and the BMI display region 774. The input region 776 includes a BMI calculation button 776a. Upon touch of the BMI calculation button 776a, a BMI is calculated based on an input height and weight.

A designated item input region 780 is disposed below the input region 776. On the designated item input region 780, a user may select hypertension, diet or diabetes as a medical history and a desired item, and may input information on allergic food. One or more items selected on the designated item input region 780 are displayed on the designated item display region 758 of the personal information screen 750 as aforementioned.

A button region 778 is disposed below the designated item input region 780. The button region 778 includes a storage button for storing corrected content, a deletion button for deleting a member and a CANCEL button for cancelling corrected content.

A control system for providing such meal plan information will be explained in more detail.

Figure 16:
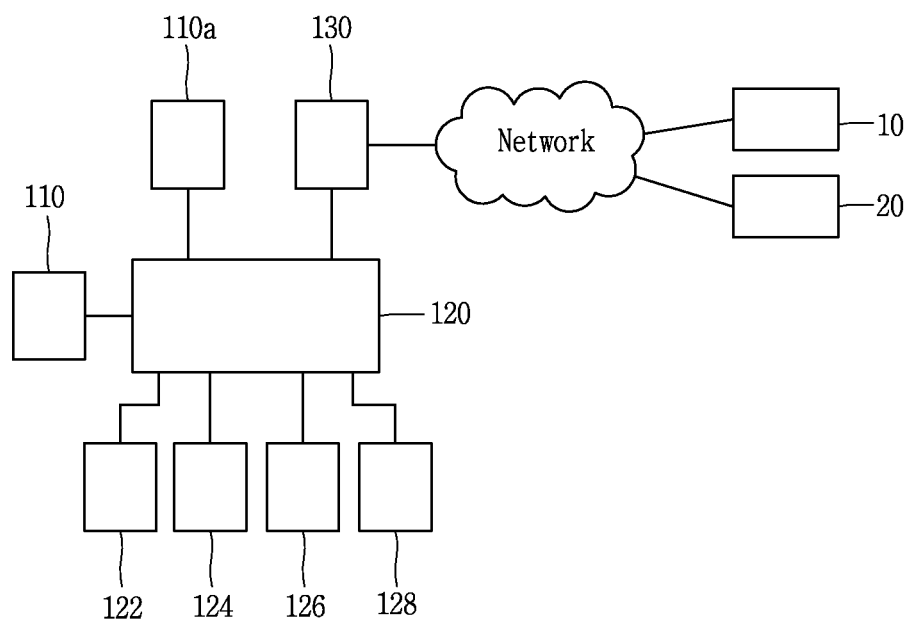
FIG. 16 is a block diagram schematically illustrating a control system in the refrigerator.

FIG. 16 is a block diagram schematically illustrating a control system in the refrigerator. A controller 120 for controlling an operation of the refrigerator is connected to the display 110 and a touch panel 110a of the display 110, thereby storing personal information input by a user in a personal information storage device 122. The controller 120 is connected to a food material information storage device 124 for storing information on types and the amount of food items stored in the refrigerator. The food material information storage device 124 may store information read by a barcode reader or an image recognition device, or information received from outside. Alternatively, information directly input by a user may be stored in the food material information storage device 124.

The refrigerator also includes a recipe storage device 126 for storing various recipes and calories per recipe, and a food information storage device 128 for storing information on each food material or effects of each dish. Information may be input to the recipe storage device 126 and the food information storage device 128 in advance. Such information may be periodically updated by a communication means 130 of the refrigerator.

The personal information may include health-related various information measured by a medical institution or an examination institution, as well as the aforementioned age, height, weight, blood pressure, medical history and allergic food. Such information may include a prescription and a medical checkup record. Such information should be continuously updated for provision of a correct meal plan, because the personal information such as the height, the weight and the blood pressure changes according to lapse of time. In a case where a user takes a medical examination or a checkup at the medical institution or the examination institution, the user's height, weight, blood pressure, etc. may be measured. Such information may be utilized to update the personal information stored in the refrigerator.

For this, the communication means 130 is configured to be connected to an external personal information server 10 provided at a medical institution or an examination institution, through a wideband network such as the Internet, and to receive newly-measured information.

Such personal information may be measured at any place rather than the aforementioned institutions. For instance, such personal information may be frequently measured by a user's extensometer or body weight scale. Alternatively, such personal information may be measured by various types of external measuring devices 20 equipped in a fitness club, etc. In recent years, the external measuring device 20 is provided with a communication means. Accordingly, such personal information may be updated using the external measuring device 20.

Alternatively, such personal information may be updated as a user touches the touch panel.

Figure 17:
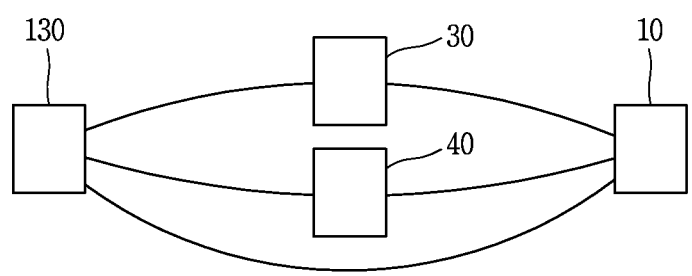
FIG. 17 is a block diagram schematically illustrating a connected state between the refrigerator and an external personal information server.

FIG. 17 is a block diagram schematically illustrating a method for connecting the external personal information server 10 with the communication means 130 of the refrigerator. The communication means may be connected to the external personal information server 10 provided at an external institution (e.g., medical institution or examination institution), via a central server 30. The central server 30 is configured to store information acquired from a plurality of institutions in an assembled manner. Under such configuration, a user can easily receive personal information measured at various places if he or she is connected to the single central server 30.

The communication means 130 may be connected to a mobile terminal 40 such as a smart hone. The mobile terminal 40 may be connected to the external personal information server 10 through a mobile communication network such as an Internet network, a 3G or an LTE network. Personal information stored in the mobile terminal 40 may be connected to the communication means 130 through a wired or wireless network provided at a user's home or an NFC. In this case, a user's authentication process through the mobile terminal 40 is facilitated. Accordingly, authentication procedures can be simplified, and information leakage due to hacking, etc. can be reduced. Alternatively, the communication means 130 and the external personal information server 10 may be directly connected to each other.

Figure 18:
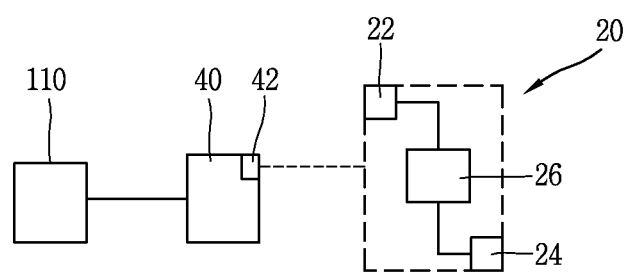
FIG. 18 is a block diagram schematically illustrating a connected state between the refrigerator and an external measuring device.

FIG. 18 is a block diagram schematically illustrating a method for connecting the external measuring device 20 to the communication means 130. The external measuring device 20 may be connected to the communication means 130 through an NFC tag 42 of the mobile terminal 40. For this, the external measuring device 20 includes the NFC tag 22, a measuring means 24, and a microcomputer 26 for controlling an operation of the NFC tag 22 and the measuring means 24. Once personal information is measured by the measuring means 24, the personal information is transmitted to the mobile terminal 40 through the NFC tag 22. Then, the personal information transmitted to the mobile terminal 40 may be transmitted to the communication means 130 through a wired or wireless network provided at home.

The mobile terminal 40 and the communication means 130 of the refrigerator may be connected to each other through an NFC. The external measuring device 20 and the mobile terminal 40 may be connected to each other through a wired or wireless communication means.

Such personal information transmitted to the refrigerator is compared with pre-stored personal information for update. More specifically, personal information is stored in the personal information storage device 122 together with a measured time. Accordingly, upon input of new personal information, a measured time of the new personal information is compared with that of the pre-stored personal information for determination whether to update the pre-stored personal information or not. Generally, a user directly inputs his or her personal information to the touch panel, shortly after measurement of the personal information. Accordingly, an update process is performed by considering an input value as recent information. In a case where information is received from an external institution or an external measuring device, a measured time of the information is compared with that of pre-stored information. As a result of the comparison, whether to update the pre-stored information or not may be determined.

Under such configuration, a user's personal information can be continuously updated, and thus a more precise meal plan can be provided.

Processes of providing a meal plan based on various types of input information will be explained.

A reference meal plan may be firstly set. Then a meal plan may be generated by excluding dishes cooked with ingredients which should not be taken, from the reference meal plan. That is, dishes which can be cooked by utilizing all food ingredients stored in the refrigerator are provided. Then, the dishes are combined with one another to determine a reference meal plan. Then, dishes using harmful ingredients may be excluded from the reference meal plan by considering a user's designated item, thereby determining a meal plan. For instance, if a user's designated item is hypertension, dishes using ingredients harmful to hypertension may be excluded from the entire dishes included in the reference meal plan. Then, the rest dishes may be used to determine a meal plan.

In case of a family meal plan, dishes harmful to members may be excluded from the entire dishes included in the reference meal plan. Then, the rest dishes may be used to determine a meal plan.

Alternatively, ingredients (food materials) harmful to a user's designated item may be excluded from all stored ingredients. Then, the rest ingredients may be used to determine a meal plan.

The foregoing embodiments and advantages are merely exemplary and are not to be considered as limiting the present disclosure. The present teachings can be readily applied to other types of devices. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A refrigerator comprising:
   an input unit configured to receive a personal information related to a user, wherein the personal information includes both priority information and user heath status information;
   a storage device to store food information related to at least one food item disposed in the refrigerator;
   a recipe storage unit configured to store recipes for dishes;
   a controller configured to:

generate a reference meal plan that includes dishes based on the food material information and the recipes, determine the dishes that are harmful to a health of the user according to the personal information and the food information, generate a user meal plan for the user that excludes the harmful dishes from the dishes included in the reference meal plan, and control the display unit to display a meal plan screen, the meal plan screen comprising a personal meal plan screen that includes the user meal plan, nutrition information for the user meal plan and the user health status information; and a display unit controlled by the controller that displays the meal plan screen.

2. The refrigerator of claim 1, wherein a personal profile display region is positioned on the personal meal plan screen, wherein a plurality of selectable taps are arranged on a right side of the personal profile display region, and the plurality of selectable taps include a meal plan guidance tap, and wherein upon selection of the meal plan guidance tap, the user's health information is provided and the nutrition information on the meal plan is provided as a graph.

3. The refrigerator of claim 2, wherein the controller updates pre-stored personal information that is stored in the storage device when the personal information has been input through the input unit.

4. The refrigerator of claim 3, wherein when the personal information has been input from the external device, the controller determines whether to update the pre-stored personal information by comparing an updated date of the pre-stored personal information with an acquired date of the personal information, such that the pre-set stored personal information is updated when the acquired date is more recent than the updated date and the pre-set stored information is not updated when the acquired date is not more recent than the updated date.

5. The refrigerator of claim 4, wherein the external device is an external storage device that is included in a personal information server provided at a medical institution or an examination institution, and the server stores at least a portion of the user's personal information.

6. The refrigerator of claim 5, wherein the communication unit requests the personal information from the personal information server and provides the personal information server with authentication information on an information request right, and receives the personal information from the personal information server.

7. The refrigerator of claim 6, wherein the storage device stores the generated meal information for a predetermined time.

8. The refrigerator of claim 4, further comprising a communication unit configured to receive the personal information from an external device, wherein the external device is an external storage device.

9. The refrigerator of claim 4, further comprising a communication unit configured to receive the personal information from an external device, wherein the external device is an external measuring device.

10. The refrigerator of claim 9, wherein the external measuring device includes a diagnosis device that utilizes NFC to transmit the personal information to the communication unit.

11. The refrigerator of claim 10, wherein the external device is an external measuring device that measures a user's personal information, and transmits the measured personal information to a mobile terminal via an NFC tag, and transmits the measured personal information to the refrigerator from the mobile terminal.

12. The refrigerator of claim 1, wherein the personal information comprises at least one of a birth date, a height, a weight, a blood pressure, allergy information, a medical information, and a prescription, and wherein the priority information for the allergy information and the medical information are pre-set to have the highest priority of the personal information unless the priority information of the personal information is designated otherwise.

13. The refrigerator of claim 12, wherein the personal information comprises at least one designated item and at least one non-designated item, the designated item having a higher priority than the non-designated item.

14. The refrigerator of claim 1, wherein the input unit is configured to receive personal information related to more than one user, wherein the controller generates common meal information related to a common meal plan for the more than one user based at least in part on the meal plan for each of the more than one user, wherein the common meal plan includes at least one common food item included in the meal plan for each of the more than one user, whereby the meal plan for each of the more than one user is a specific personal meal plan.

15. The refrigerator of claim 14, wherein the display unit displays information related to the specific personal meal plan or the common meal plan according to the user input.

16. The refrigerator of claim 1, wherein the priority information is designated as either high priority or low priority, whereby the display unit displays the personal information designated as high priority so that it is visually distinguishable from the personal information designated as low priority.

* * * * *